United States Patent [19]
Jepsen

[11] 3,999,768
[45] Dec. 28, 1976

[54] PISTON RING

[76] Inventor: Robert E. Jepsen, 355 Berger St., Emmaus, Pa. 18049

[22] Filed: Nov. 1, 1972

[21] Appl. No.: 302,932

[52] U.S. Cl. .............................. 277/152; 92/255; 277/183
[51] Int. Cl.² ...................................... F16J 15/32
[58] Field of Search ...... 277/9, 152, 165, 181–186, 277/212 F, 193; 92/255

[56] References Cited
UNITED STATES PATENTS

| | | | |
|---|---|---|---|
| 3,118,681 | 1/1964 | Fuehrer | 277/9 |
| 3,637,222 | 1/1972 | Wikinson | 277/152 |

Primary Examiner—Robert I. Smith
Attorney, Agent, or Firm—James C. Simmons; Barry Moyerman

[57] ABSTRACT

A piston ring having a general shape of a cylinder with the first section in the shape of an annulus for engaging a portion of the surface of a piston to provide a fluid-tight seal with the piston and a second section in the shape of a thin-walled bowl with sealing means on the outer surface of the bowl for providing a fluid-tight seal between the ring and the cylinder wall. The ring is especially constructed for use at cryogenic temperatures of −320° F and below.

1 Claim, 3 Drawing Figures

U.S. Patent    Dec. 28, 1976    3,999,768
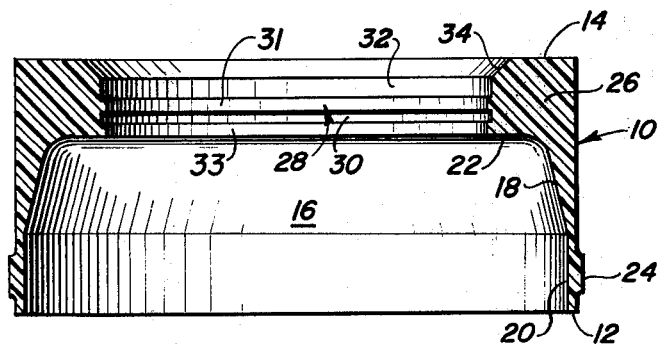
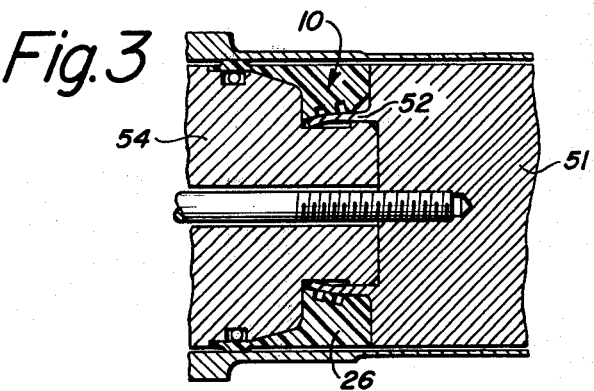
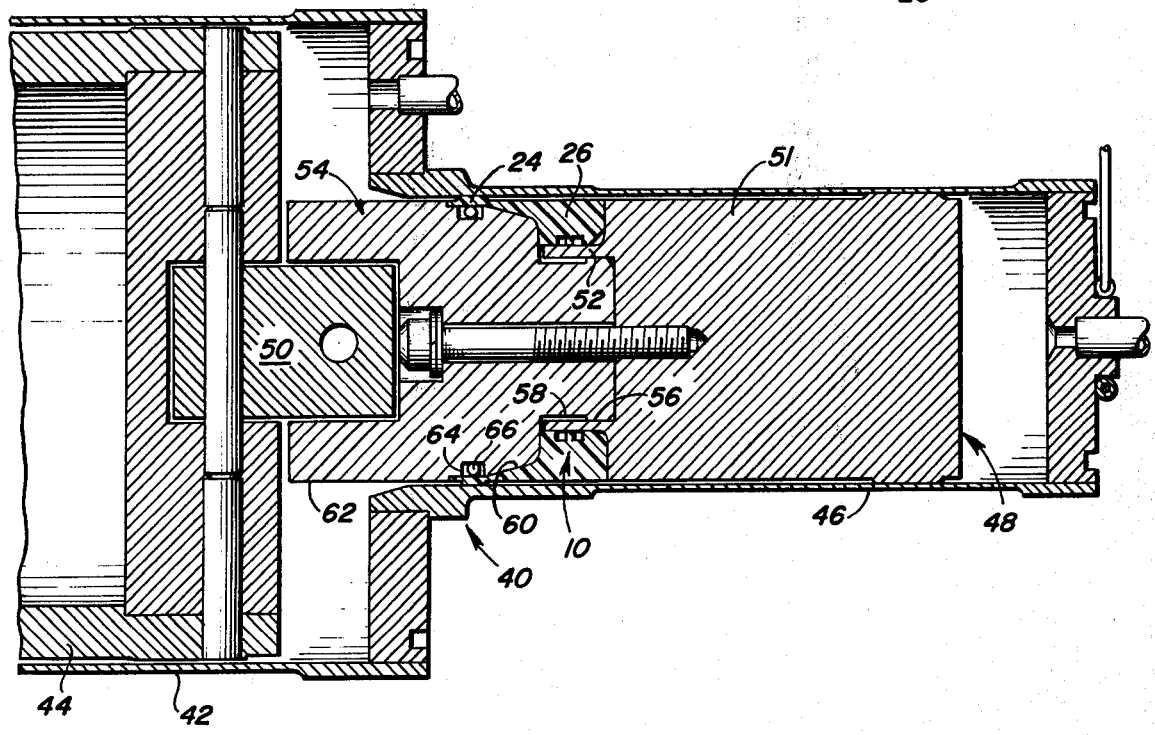

PISTON RING

BACKGROUND OF THE INVENTION

1. Field of the Invention.

The present invention pertains to an improved piston ring for use in reciprocating pumps, compressors, expansion engines and the like. In particular, the present invention relates to a piston ring for use with a device for producing a cryogenic refrigeration such as shown in U.S. Pat. No. 3,620,029. Cryogenic refrigeration generally relates to temperatures at minus 150° F down to minus 450° F.

2. Description of the Prior Art.

U.S. Pat. No. 3,373,999 and 3,540,746 disclose piston rings for use with refrigeration devices such as compressors for producing refrigeration at cryogenic temperatures. The piston rings disclosed in the two patents are of the dry lubricated type since at temperatures of minus 150° to minus 450° F conventional lubrication oils would freeze.

Although rings of the type shown in the aforementioned patents have been found to be satisfactory for compressors, they have been found to be less than effective for a refrigeration device shown in U.S. Pat. No. 3,620,029. When applied to a displacer-expander type refrigerator as shown in the last-mentioned patent, the patented piston rings, while exhibiting better leakage characteristics than conventional rings, tend to show some minor leakage between the piston and the ring, thereby, decreasing the overall efficiency of the refrigeration device. This is especially true for a device shown in FIG. 3 of the lastnamed patent, wherein there is a two-stage displacer for producing two levels of refrigeration.

SUMMARY OF THE INVENTION

In order to avoid the aforementioned problems and to provide an improved piston ring, it has been discovered that a ring having the overall shape of a cylinder with a first section in the shape of a thick-walled annulus adjacent to a second portion in the shape of a thin-walled bowl; it is possible to achieve effective sealing between the piston and the cylinder wall and between the piston ring and the piston. Sealing is further enhanced by constructing the piston in a manner that causes a portion of the piston in contact with the piston ring to deflect within its elastic limit due to contraction of the piston ring at low temperature, thereby, preventing permanent plastic deformation of the piston ring due to differential contraction of the piston and piston ring at the contact surface.

Therefore, it is the primary object of this invention to provide an improved piston ring for use with cryogenic refrigeration devices.

It is still another object of this invention to provide a piston ring that provides a positive seal between the piston and cylinder wall and between the piston and the piston ring during the entire operating temperature range.

It is yet another object of this invention to provide a piston and piston ring assembly having positive gas sealing at cryogenic temperatures.

BRIEF DESCRIPTION OF THE DRAWINGS

FIG. 1 is a cross-sectional drawing of a piston ring according to the present invention.

FIG. 2 is a fragmentary cross-sectional view of a displacer-expander refrigerator with the piston ring of the present invention installed therein.

FIG. 3 is an enlarged fragmentary view of the installed ring of FIG. 2 showing the improved gas sealing achieved by the combination of the ring and the displacer.

DETAILED DESCRIPTION OF THE PREFERRED EMBODIMENT

Referring to FIG. 1, there is shown a piston ring 10 according to the present invention. The ring 10 has a proximal or first end 12 and a distal or second end 14. At the proximal end 12 there is provided a generally bowl-shaped portion 16 having a relatively thin wall 18. As will be shown in connection with FIG. 2, the bowl-shaped configuration 16 is selected to engage the displacer (piston) along a substantial portion of its mating surface. The bowl 16 has a first portion 20 having a substantially uniform wall thickness or generally cylindrical in shape. Adjacent the first section 20, the wall gradually increases in thickness until it reaches the bottom of the bowl 22. On the outer surface of bowl section 16, there is provided a circumferential surface 24 for engaging the cylinder wall as will hereinafter be more fully explained in connection with FIG. 2. The axial length of wall 18 (between end 12 and surface 22) is selected to provide flexibility of surface 24 so that small forces are necessary to effect fluid-tight sealing of the surface 24 to the cylinder wall as will be shown in connection with FIG. 2. At the distal end 14 of the ring 10, there is provided an annular section 26 of relatively thick cross-section. On the inner wall 28 defined by the annulus, there is a pair of grooves 30, 32 defining corresponding lands 31, 33, which provide a more positive seal between the displacer (piston) as will hereinafter be more fully explained. A chamfer 34 is provided on the extreme distal end of the annulus to aid in the installing of the ring on the displacer (piston).

Referring to FIG. 2, there is shown a stepped down, two-stage displacer-expander 40. The displacer-expander 40 consists of a first-stage 42 having therein a first piston 44 and a second-stage 46 having therein a second piston shown generally as 48. The pistons 44 and 48 are connected by a universal coupling 50. The coupling 50 allows for mis-alignment between the stages 42 and 46. In this respect, the displacer-expander 40 is similar to FIG. 3 of U.S. Pat. No. 3,620,029. The first-stage displacer (piston) 44 is provided with a conventional seal as detailed in the aforementioned patent. The second-stage piston comprises a lower section or body 51 having thereon a thin walled, cylindrical section 52. The upper section or head of displacer (piston) 48 is shown as 54 and is in the form of a short-necked bottle. The neck of the bottle-shaped displacer head 54 contains an annular projection 56 for centering the head 54 within the cylindrical section 52 of the body 51 of piston 48. The projection 56 and the overall shape of displacer head 54 define an L-shaped groove 58 between cylindrical section 52 of displacer body 51 and displacer head 54. The portion of displacer head 54 above the neck has a shape complimentary to the bowl shape 16 of ring 10 with the balance of displacer head 54 being generally cylindrical in shape as shown at 62. There is also provided in displacer head 54 a circumferential groove 64 which receives an elastic device such as garter spring 66. The groove 64 is placed in displacer head 54 so that when the ring 10 and the piston 48 are assembled the projecting portion 24 of ring 10 is directly adjacent to the groove 64 of the head 54 of displacer 48. The annular portion 26 or ring 10 engages the cylindrical projection 52 of the body 51 of displacer 48 as shown with the lands 31, 33 of the annulus wall 28 securely engaging the outer wall of the cylindrical section 52 of displacer head 51.

Referring to FIG. 3, it can be seen that when the piston ring 10 is assembled with the displacer body 51 and head 54 that the annular portion 26 of ring 10 causes the walls of the cylindrical section 52 to bend inwardly in the L-shaped groove 58 formed between the two displacer sections 51 and 54 respectively. This deflection is caused by the selection of the thickness of the projecting cylindrical portion so that the material deflects within its elastic limit resulting in a compliance fit between piston body 51 and ring 10.

The deflectin of cylindrical section 52 prevents plastic deformation (permanent set) in the annular portion 26 of ring 10 due to differential contraction of the ring 10 and cylindrical section 52. With only elastic deformation of the piston ring annular portion 26, there is no separation between piston body 51 and ring 10 with changes in temperature during the operating cycle of the displacer-expander 40. This assures a continuous seal between piston and ring that is fluid tight and that in combination with section 24 of ring 10 prevents fluid leakage on either inside or outside of the ring. As the ring expands, the cylindrical section 52 of displacer (piston) body 51 returns to its original shape and remains in contact with lands 31, 33 of ring 10.

Referring back to FIG. 2, the resilient spring device 66 forces the surface portion 24 of piston ring 10 against the cylinder wall of the second-stage 46 of the displacer-expander 40 thereby assuring a fluid-tight seal between the piston ring 10 and the inner wall of the cylinder section of second-stage 46 of the displacer-expander 40. Spring device 66 can be of any conventional type such as garter springs, "O" rings, gas fill "O" rings, coil springs and the like.

The preferred material for the piston ring 10 is a carbon filled polytetrafluroethylene which will not become brittle at cryogenic temperatures and will have enough flexibility to provide the positive sealing desired.

The preferred material for the body 51 and head 54 of displacer (piston) 48 is a fine weave cotton cloth phenolic laminate or similar plastic resin. For the materials shown in order to achieve the proper deflections of the cylindrical portions 52 of piston section 51, it has been found that if the overall length of the piston is approximately 2½ inches and the cylindrical section should have a diameter on the order of 1.25 OD and 1.125 ID thereby defining a wall thickness of approximately ⅛ inch. The height of the thin section of the wall should be on the order of approximately ½ inch. With the materials shown, this provides an adequate structure for achieving deflection in the elastic range of the material used.

A device shown in FIG. 2 was constructed and operated at temperatures about minus 350° F with no gas leakage between the ring 10 and the piston or between the ring 10 and cylinder wall.

While specific materials have been set out as an aid in understanding the invention, the invention is not limited to specific materials since these are in large part determined by operating temperatures and pressures and a wide choice is available as long as the characteristics of the plastic/elastic deformation relationships are observed.

Having thus described my invention, what is desired to be secured by Letters Patent of the U.S. is set forth in the appended claims.

I claim:

1. A piston ring of generally hollow cylindrical shape having a proximal end and a distal end:

the proximal end having therein a generally thin walled, bowl shaped portion with the wall extending from the proximal end of the ring to a thickened annular portion toward the distal end of the ring;

the annular portion of the ring having an inner surface for engaging a piston and having means therein to engage the piston in fluid-tight relationship, said means including at least two spaced apart circumferential lands for engaging the piston; and means on the outersurface of the wall of the proximal end of the ring to effect a movable fluid-tight seal between the piston ring and the cylinder wall.

* * * * *